United States Patent [19]

Demase

[11] 4,027,474

[45] June 7, 1977

[54] FUEL PREFILL AND DISTRIBUTOR VALVE CONSTRUCTION

[75] Inventor: John P. Demase, Colchester, Conn.

[73] Assignee: United Technologies Corporation, Hartford, Conn.

[22] Filed: Mar. 5, 1976

[21] Appl. No.: 664,131

[52] U.S. Cl. .......................... 60/39.28 R; 60/241; 137/608; 137/101; 137/512.2; 137/512.3; 137/628; 137/630
[51] Int. Cl.² ...................................... F02C 9/08
[58] Field of Search ............... 137/10 D, 101, 119, 137/512.2, 512.3, 627.5, 628, 629, 630, 608; 60/39.28 R, 241, 243

[56] References Cited

UNITED STATES PATENTS

| | | | |
|---|---|---|---|
| 2,724,239 | 11/1955 | Fox | 60/39.28 R |
| 2,927,425 | 3/1960 | Werts | 60/39.28 R |
| 2,963,082 | 12/1960 | Binford | 60/39.28 R |
| 3,067,576 | 12/1962 | Campbell | 60/39.28 R |
| 3,106,934 | 10/1963 | Rogers | 60/39.28 R |
| 3,141,298 | 7/1964 | Simpson | 60/241 |
| 3,750,396 | 8/1973 | Tucker | 60/39.28 R |
| 3,874,170 | 4/1975 | Lewis | 60/241 |

Primary Examiner—Clarence R. Gordon
Attorney, Agent, or Firm—Norman Friedland

[57] ABSTRACT

A fuel distributor valve for splitting and proportioning fuel feeding more than one set of fuel nozzles of a turbine type power plant is improved upon by adding thereto means to prefill the secondary nozzle and its attendant manifold and fuel passages immediately preceding actuation.

13 Claims, 4 Drawing Figures

4,027,474

FUEL PREFILL AND DISTRIBUTOR VALVE CONSTRUCTION

BACKGROUND OF THE INVENTION

This invention relates to a fuel system for turbine type power plants and particularly to the fuel distributing valve.

This invention constitutes an improvement over the invention described and claimed in a patent application entitled Fuel Distribution Valve, filed by Joseph R. Baker on even date and assigned to the same assignee. The co-pending application covers a simplified fuel distribution valve that is characterized by its simplicity and minimum number of movable component parts. A piston within a movable sleeve serves to regulate the flow as a function of the different of fuel pressure and burner pressure to a primary or set of primary fuel nozzles in one position of the sleeve and splits the flow to the primary and secondary or set of secondary fuel nozzles when the sleeve is in the other position. This apparatus not only splits the flow but regulates the proportionality of the flow being distributed.

In addition to the above, this invention contemplates prefilling the secondary nozzle or nozzles and their attendant manifold, flow lines and passages prior to being actuated. It accomplishes this aspect not only in an efficacious manner but does so without introducing a great deal of complexity to the system.

SUMMARY OF THE INVENTION

This invention relates to an improved fuel distribution valve for a turbine type of plant that includes fuel prefill means.

Other features and advantages will be apparent from the specification and claims and from the accompanying drawings which illustrate an embodiment of the invention.

DESCRIPTION OF THE PREFERRED EMBODIMENT

Figure 1:
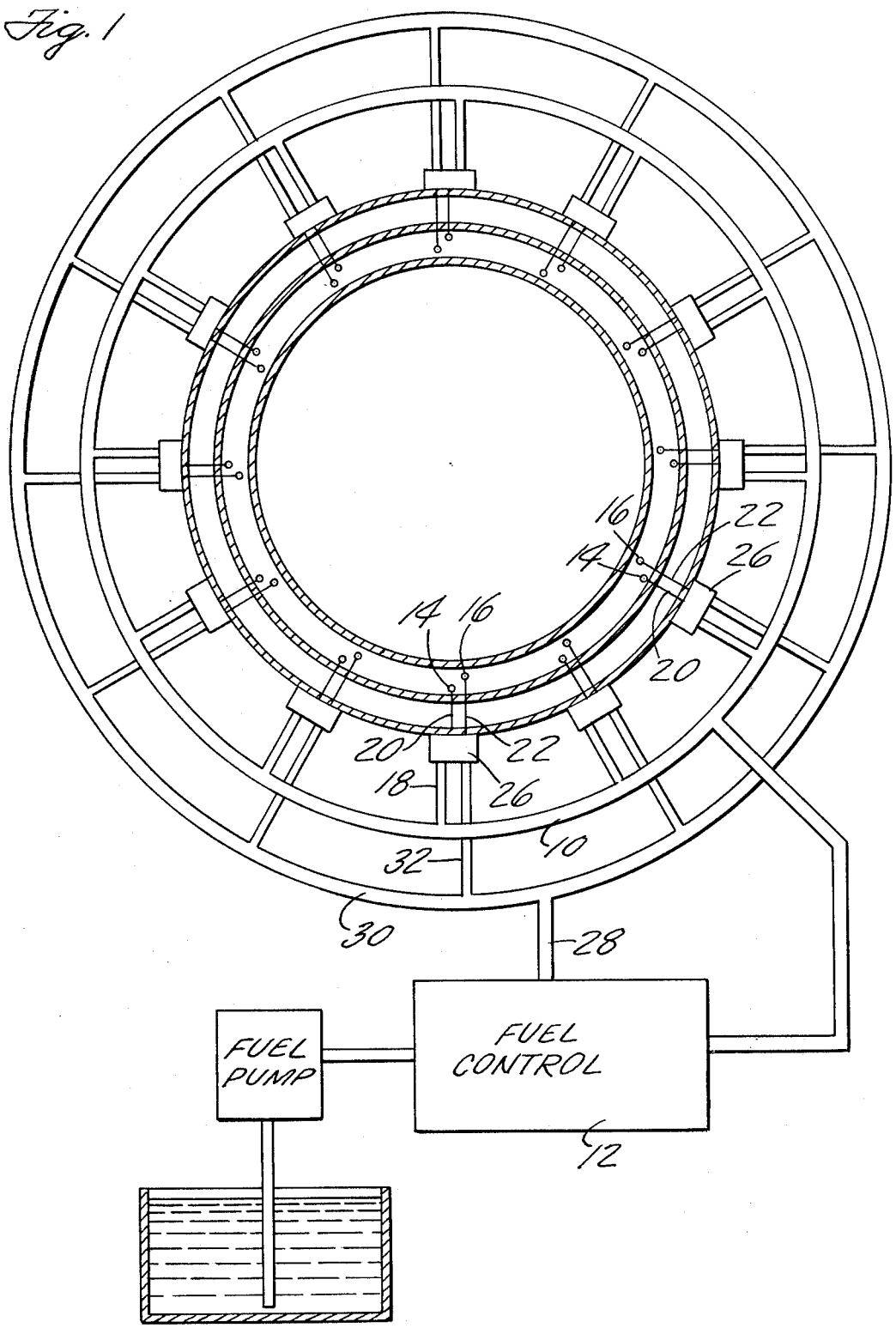
FIG. 1 is a schematic showing the fuel distribution system to the combustor of a turbine type power plant.

As mentioned above, this invention is an improvement of the fuel distribution system for a combustor of a turbine type power plant, which, for example, is exemplified by the JT9D engine manufactured by the Pratt & Whitney Aircraft division of United Technologies Corporation, and reference should be made thereto. As in the case of larger engines, a dual fuel system is employed conventionally comprising primary fuel nozzles and secondary fuel nozzles which is ignited or actuated for high thrust operation. Such a fuel distribution system is shown in FIG. 1 which comprises fuel manifold 10 being supplied metered fuel by a suitable fuel control illustrated in blank as reference number 12 which serves to feed fuel to the sets of primary nozzles 14 and secondary nozzles 16 via trunk lines 18, feed lines 20 and 22, and distributor valve 26. A suitable fuel control may be of the type exemplified by the JFC-60, JFC-68 that is commercially available from the Hamilton Standard Division of United Technologies Corporation. The fuel control also serves to provide the command signal to actuate the distribution valve 26 for turning on the secondary nozzles. Although any command signal may be utilized so long as it is indicative of a higher thrust or power demand. In this instance such a signal may be a compressor speed signal readily available as a speed servo pressure which may be transmitted to distributor valve 26 by way of conduit 28, manifold 30 and trunk lines 32.

Figure 3:
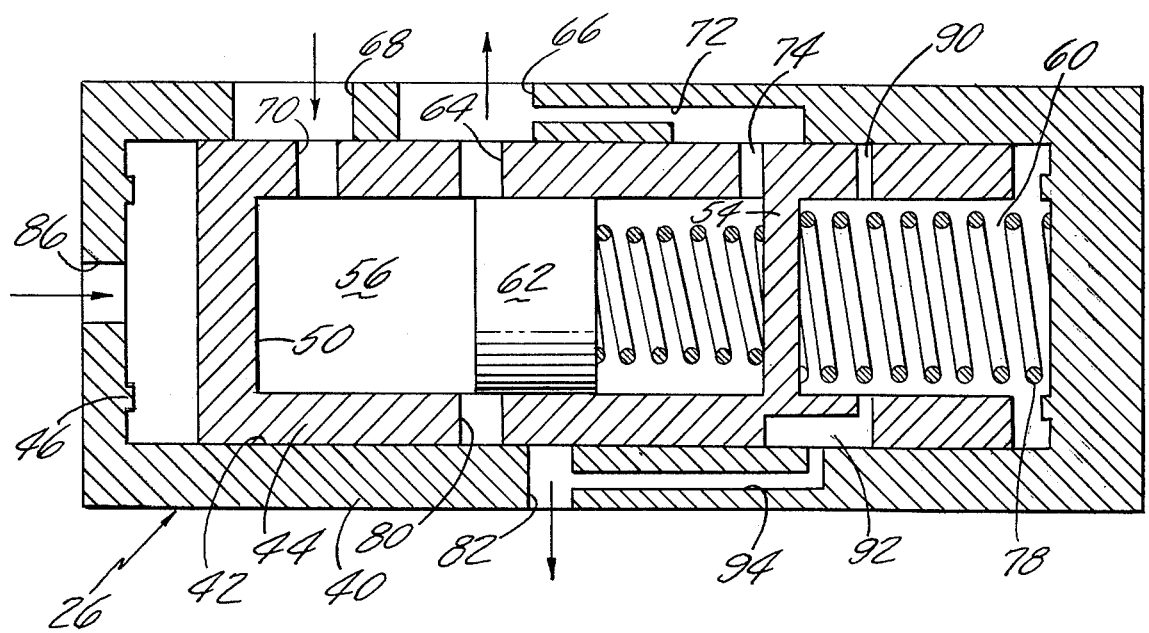
FIG. 3 is the identical view of FIG. 2 in a second position, which is the transitional position just prior to actuating the secondary nozzles.
Figure 4:
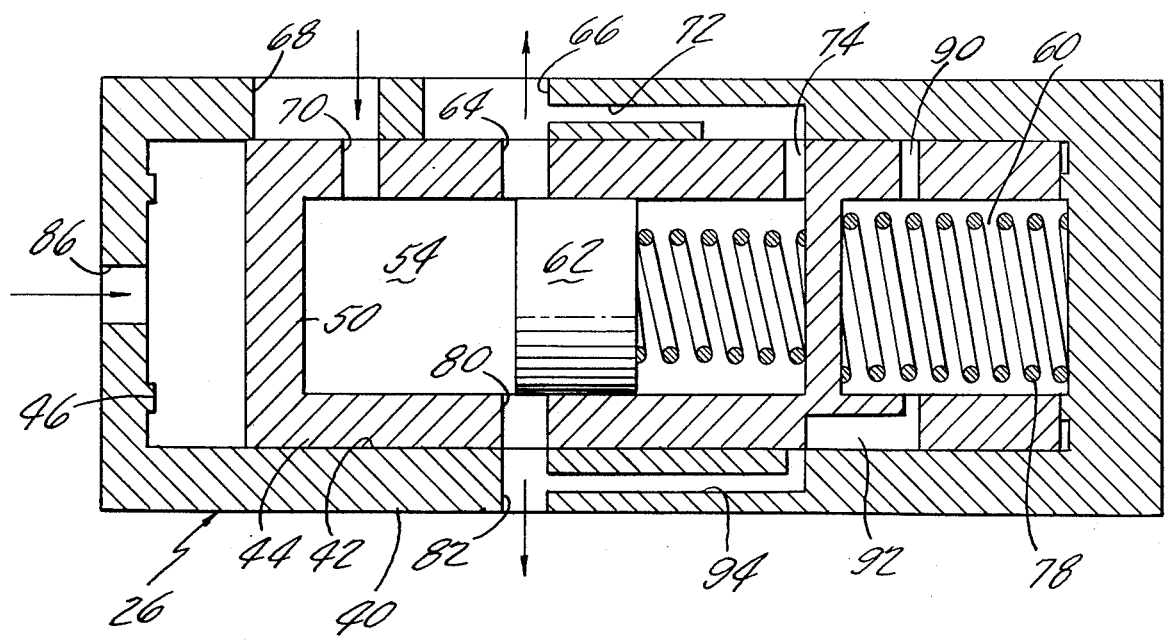
FIG. 4 is the identical view of FIG. 2 when in a third position or after the secondary nozzles are actuated and the fuel is being split.

As best seen from FIGS. 2–4 the distributor valve is basically the same as the one desclosed in the aforementioned co-pending patent application, although the arrangement of component parts have been modified to the extent noted below.

Housing 40 has a central bore 42 in which cylindrical sleeve 44 is slidably mounted and movable between fixed stops 46 and 48. Sleeve 44 is closed at its left end by wall portion 50 having a reaction face 52. Partition wall 54 intermediate its ends divides the sleeve into chambers 56 and 60.

Piston 62 is positioned in chamber 56 and cooperates with port 64 formed in sleeve 44 which is in communication with primary nozzle 14 via port 66 formed in housing 40 and connecting line 20. In effect, piston 62 acts as a land and regulates the flow through port 64 as a function of the difference of $P_f$ (fuel pressure) and $P_B$ (burner pressure). It will be noted that the piston senses the pressure of fuel from the fuel control admitted into chamber 56 via port 68 (formed in housing 40) and port 70 (formed in sleeve 44) and the pressure downstream of the port 64, which is fed behind piston 62 via drilled passage 72 and port 74, and operates on sprin 76. When sleeve 44 is actuated to travel rightwardly against stop 48, return spring 78 is compressed and port 80 (formed in sleeve 44) aligns with port 82 (formed in housing 40) to direct a portion of the flow from chamber 56 to the secondary nozzle 16 via line 22 (see FIG. 4). It will be noted that piston 62, as with port 64, cooperates with port 80, to regulate the flow to the secondary nozzles as a function of $P_f - P_B$. The ports are shaped and dimensioned to establish the relationship of the desired flow areas required to distribute the flow to the primary and secondary nozzles in the required proportion and the metering of piston 62 maintains this proportionality as a function of $P_f - P_B$. Obviously, distributor valve 26 may include additional ports to feed other nozzles depending on the number of nozzles utilized in the engine.

When there is a demand for higher power, a signal generated by the fuel control 12 will be relayed to the diverter valve by way of a pressure admitted to act on the reaction face 52 via line 28, manifold 30, trunk line 32 and port 86. This signal which will overcome the force of return spring 78 will translate the sleeve 44 rightwardly until its end abuts against fixed stop 48. Spring 78 serves to return the sleeve to its original position after shutdown or whenever the pressure acting on reaction face 52 subsides to below a predetermined value.

In accordance with this invention the partition wall 54 and the variable volume chamber 60 are dimensioned to provide a given volume in the extended position so as to completely prefill the secondary nozzles and its interconnecting passages and lines with fuel just before valve 26 connects the secondary nozzles to the main fuel control. As can be seen in FIG. 2 passage 72 extends to align with port 90 for admitting fuel into chamber 60 at this moment of the valve 26 operation.

Figure 2:
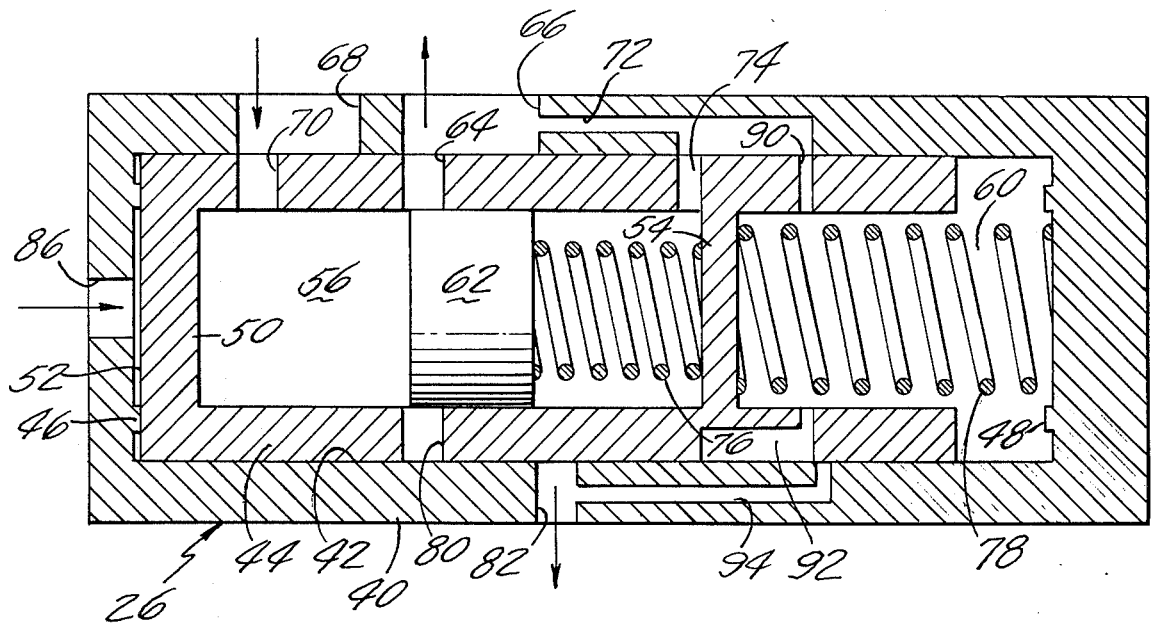
FIG. 2 is a sectional view showing the details of the invention in a first position when the valve is distributing fuel solely to the primary nozzle.

During the transient from full primary flow to splitting the flow, the sleeve will translate rightwardly so that port 92 aligns with passage 94, which in turn communicates with port 82 and the secondary nozzle 16 (see FIG. 2). The axial expanse of port 92 is such that it communicates with passage 94 almost its entire stroke, and at the end of the stroke the passages align in the closed off position. The expanse of passage 72 is such that it is continuously in communication with port 74 to assure that piston 62 is continuously operative. Also port 90 is blocked off as port 92 is exposed assuring only the prescribed volume of fuel is used for prefilling.

From the foregoing it is apparent that the quantity of fuel admitted into chamber 60 will be pumped into the secondary nozzle 16 and its attendant connecting lines and passages and when ports 80 and 82 are on their line-on-line position fuel will be immediately injected into the burner at the required pressure without any loss of time.

It should be understood that the invention is not limited to the particular embodiments shown and described herein, but that various changes and modifications may be made without departing from the spirit or scope of this novel concept as defined by the following claims.

I claim:

1. A distribution system for a primary and secondary fuel nozzle system for a combustor of a turbine type power plant comprising at least one distributor valve having a first movable means for exposing a fuel opening in said first movable means communicating with said primary nozzle in a first and second position thereof and another fuel opening in said first movable means communicating with said secondary nozzle solely in the said second position thereof, a second movable means movable relative to said first movable means for regulating flow of fuel through both of said fuel openings, said second movable means having means for proportioning the flow through said fuel openings being responsive to the pressure drop across at least one of said openings, and said first movable means including means to prefill the secondary nozzles and its associated communicating connections with fuel immediately preceding said second position.

2. A distribution system as claimed in claim 2 wherein said fuel distribution system includes a fuel control which meters the desired amount of fuel for power plant operation, connection means interconnecting said fuel control and said distributor valve for leading fuel to said primary and secondary nozzles as directed by said distributor valve, and means responsive to said fuel control for positioning said first movable means to said first and second position.

3. A distribution system as claimed in claim 1 wherein said first movable means includes a sleeve closed at one end and opened on the other and wall means intermediate the ends thereof dividing said sleeve into two compartments.

4. A distributor valve as claimed in claim 4 wherein said closed end includes a reaction face, and means connecting said reaction face for supplying a pressure for positioning said sleeve to said second position.

5. A distributor valve as claimed in claim 5 wherein said second movable means is an axially movable piston disposed in one of said compartments in said sleeve having a first and second reaction face, said first reaction face exposed to the pressure of fuel in said chamber, and said second reaction face exposed to pressure substantially equal to the pressure in said combustor, 6. A distributor valve as claimed in claim 5 wherein said wall means and the end of said bore define a variable volume chamber, connecting means interconnecting said variable volume chamber and said secondary nozzle solely during the transition from said first position and said second position to prefill the secondary nozzle and its attendant communicating passages with fuel and means for filling said variable volume chamber with fuel and closing said fill means at the start of said transition.

7. A distributor valve as claimed in claim 6 including spring means in said variable volume chamber urging said sleeve in said first position.

8. A distributor valve as claimed in claim 7 wherein said spring means is a coil spring.

9. A fuel distributor valve for directing fuel to at least one primary nozzle and at least one secondary nozzle in a combustor of a turbine type power plant, comprising a housing having a central bore closed at each end, a sleeve having a closed end disposed in said bore movable to two positions, a piston in said sleeve dividing said sleeve into two compartments, one of said compartments continuously receiving fuel flow to be distributed to said combustor, said piston cooperating with a first port in said sleeve communicating with said primary nozzle, said sleeve having a second port rendered inoperative in said first position of said sleeve, said sleeve movable to a second position for directing fuel from said one of said compartments to said second port through an opening in said housing communicating with said secondary nozzle whereby said second port is rendered operative, means for porting fuel from a point intermediate said first port and said primary nozzle to said other of said compartments to control said piston for proportioning the fuel flow to said primary and secondary nozzles as a function of the pressure of fuel and the pressure of said combustor, said sleeve having wall means intermediate the ends thereof defining at its open end with said housing a variable volume chamber, means for filling said variable volume chambers with fuel and means including passage means for prefilling said secondary nozzle and its attendant connection means with fuel from said variable volume chamber while said sleeve simultaneously blocks said filling means.

10. A fuel distributor valve as claimed in claim 7 including a spring in said other of said compartments bearing against said piston to urge it in a port closing position.

11. A fuel distributor valve as claimed in claim 8 wherein said end opposite said open end of said sleeve includes an end wall defining with said housing a chamber, signal receiving means for admitting a pressure in said chamber to bear against said end wall to urge said sleeve to its second position.

12. A fuel distributor valve as claimed in claim 9 in which said ports are presized and shaped to expose a predetermined area for each position of said piston so as to provide a predetermined amount of fuel flow to said primary and said secondary nozzles at each position over the stroke of said piston, and said variable volume chamber is sized to accommodate sufficient fuel to prefill said secondary nozzle and attendant connecting lines.

13. A fuel distributor valve as claimed in claim 9 including a spring in said variable volume chamber bearing against said intermediate wall means for continuously urging said sleeve in said first position.

* * * * *